Patented Sept. 16, 1930

1,775,664

UNITED STATES PATENT OFFICE

JOHN A. YOUNG, OF TORRANCE, CALIFORNIA, ASSIGNOR, BY MESNE ASSIGNMENTS, TO THE NATIONAL SUPPLY COMPANY, OF TOLEDO, OHIO, A CORPORATION OF OHIO

ROTARY GEAR DRAW WORKS

Application filed March 10, 1924. Serial No. 698,346.

This invention relates to rotary drawworks of the type employed in drilling deep wells, such as oil wells. The drawworks is usually located on the edge of the derrick floor and is provided with a cable drum on which the cable is coiled; from the drum the cable passes up to the crown block sheave, and thence down into the well.

It has been the practice to rotate the drum-shaft from a line-shaft by means of sprocket chains, and it is necessary for safety to provide boxing or guards to enclose the sprocket wheels and chains. Whenever a chain breaks, considerable inconvenience is occasioned to effect the repair and to replace the boxing. Furthermore, the use of a chain drive does not produce as compact a construction as might be desired. In using a chain drive such as referred to above, it has been customary to employ a cable drum of a relatively small diameter. The use of a drum of a smaller diameter is undesirable because it bends the cable to a small radius and is very injurious to the cable, increasing as it does the working of the strands upon each other.

It is also the present practice to provide for driving the rotary table from the line-shaft, and this has necessitated the driving of the line-shaft, and (in some types of drawworks) the sprocket chains connecting to the drum-shaft, although the cable drum is not being driven.

The general object of this invention is to provide a drawworks of very compact construction in which the drive to the drum-shaft is of such a ratio as will enable a drum of relatively large diameter to be employed. In this way, though the drum rotates at a slower angular speed than now customarily used, the peripheral speed of the drum is sufficient to take up or pay out the cable at the same speed as usual; also to provide a simple construction of drawworks which will enable the rotary table to be driven at will without driving the line-shaft or any of the mechanism of the drawworks; also to provide a construction for the drawworks which will enable the drum to rotate freely when desired without rotating any of the mechanism which drives the drum when the cable is being taken up, and to provide an arrangement of clutches and gears which facilitates the grouping of the control levers near one end of the drawworks and in such a way that the levers for controlling the main clutch and rotary table drive clutch close the clutches by a movement in the same direction. A further object of this invention is to provide a simple organization of shafting which will insure ample clearance for the sprocket wheels which enable the shaft to be driven from the engine and which transmit the motion to the rotary drawworks.

In a preferred embodiment of the invention I employ a counter-shaft for driving the line-shaft. By reason of the necessary location for the counter-shaft, the driving gears which impart the movement from the counter-shaft to the line-shaft are small, and the thrust forces exerted between their teeth are therefore extremely high and tend to force the shafts apart during the driving and when the drawworks is lifting a heavy load on the cable. One of the objects of my invention is to provide simple means for resisting such forces and for providing bearings for the counter-shaft and line-shaft which will constantly maintain the distance between the shafts unchanged; it is also an object to provide a construction for the drawworks which will enable each shaft to be supported on two bearings instead of three, as has been the customary practice.

Further objects of the invention will appear hereinafter.

The invention consists in the novel parts and combination of parts to be described hereinafter, all of which contribute to produce an efficient rotary gear drawworks.

A preferred embodiment of the invention is described in the following specification, while the broad scope of the invention is pointed out in the appended claims.

Figure 1:
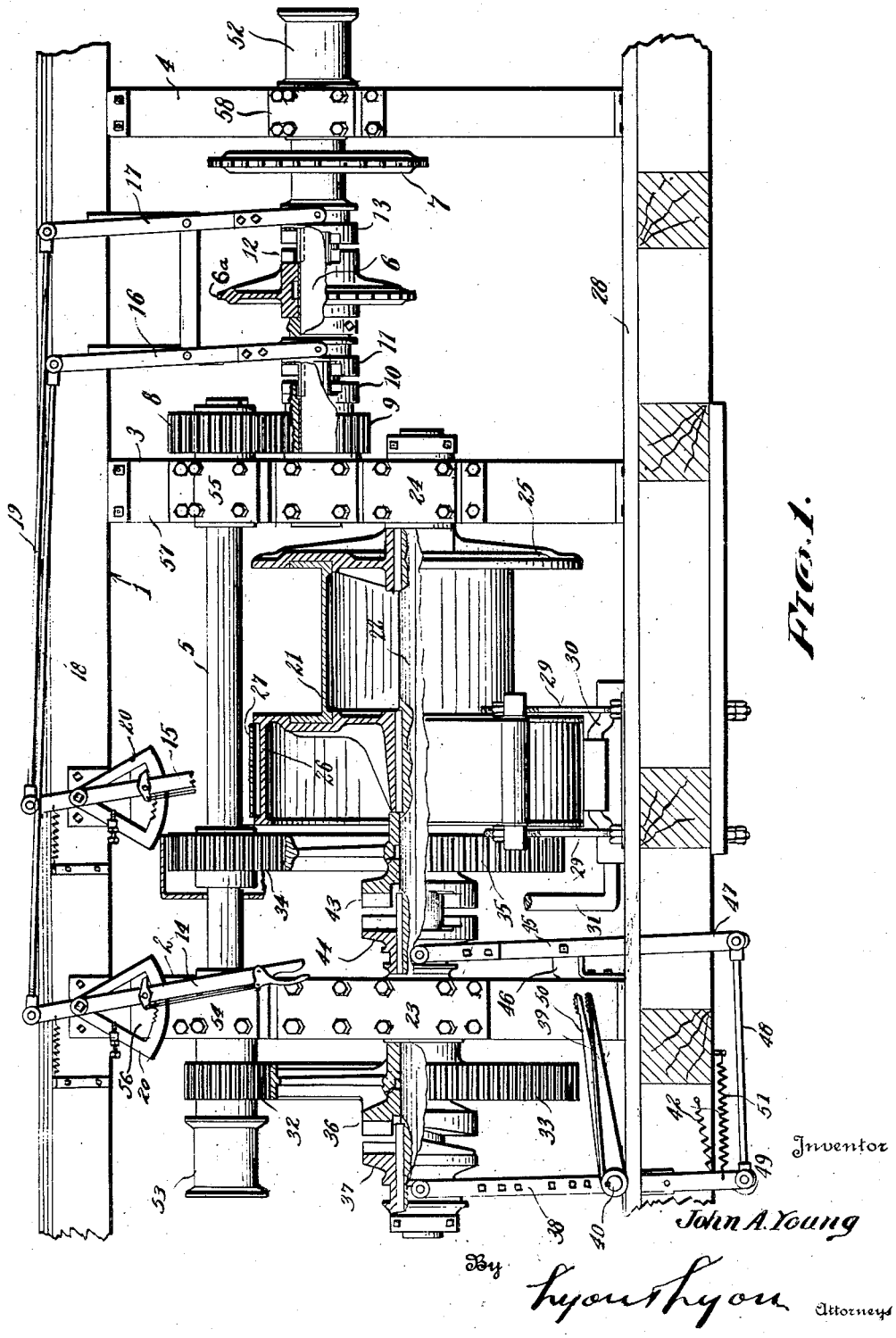
Figure 1 is a side elevation of a drawworks embodying my invention, certain parts being broken away or shown in section.
Figure 2:
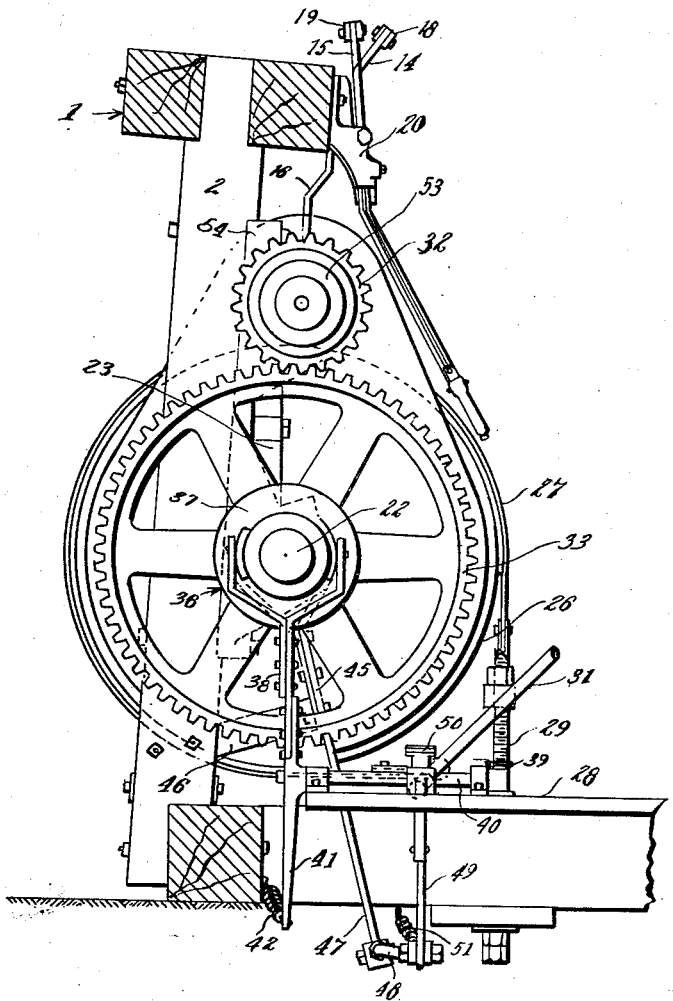
Figure 2 is an end elevation of the drawworks as viewed from the left end of Figure 1, a portion of the framing being shown in cross section and a part of the derrick floor being shown broken away.

According to my invention, I provide a counter-shaft which has means for driving the rotary table at will independently of the line-shaft which may drive the cable drum at different speeds. In order to accomplish this, I provide a frame 1, which may consist of three posts, 2, 3 and 4. On this frame and preferably near the upper ends of the posts 2 and 3 I provide a line-shaft 5. This line-shaft may be driven at will by a counter-shaft 6, which is supported on the frame parallel with the shaft 5 and disposed below the line-shaft. In this way I provide clearance for a sprocket wheel 7 which is rigid on the counter-shaft and which is driven from the engine. The line-shaft is provided with a rigid driven gear wheel 8 which meshes with a driving gear 9, which is loose on the counter-shaft.

A clutch 10 is provided including a sliding clutch collar 11 splined on the counter-shaft, for disconnecting and connecting the driving gear 9 at will to the counter-shaft. In this way the counter-shaft may be driven without rotating the gear wheels 9 and 8 so that the line-shaft will be at rest when the rotary table is being driven through the sprocket wheel 6ᵃ. This sprocket wheel 6ᵃ is loose on the counter-shaft and has its own clutch 12, including a sliding clutch collar 13 splined on the counter-shaft. The two clutches 10 and 12 are controlled by corresponding levers 14 and 15 which are mounted near each other and near the left end of the drawworks, near the operator's position. The line shaft 6 is located toward one end of the drawworks and this enables the sprocket wheel 6ᵃ for driving the rotary table to be located substantially in a plane tangent to the edge of the rotary table while the drum of the drawworks is substantially opposite to the bore of the well.

I arrange the mechanism so that these two levers 14 and 15 close the clutches 10 and 12 by a movement in the same direction. I prefer to accomplish this by having the clutch collars 11 and 13 disposed on the right-hand side of their cooperating clutch members so that both these clutches close by moving the collars toward the left. This enables me to use a simple arrangement of levers, that is to say, these clutch collars have their own clutch levers 16 and 17 which are parallel with the levers 14 and 15 respectively and connected with the upper short arms of the levers 14 and 15 by links 18 and 19.

The levers 14 and 15 are provided with quadrants 20 to enable them to lock the clutches in their closed position. The cable drum 21 is of relatively large diameter and rigidly secured to a drum-shaft 22, the ends of which are rotatably mounted in bearings 23 and 24 on the posts 2 and 3. The drum 21 has a simple head 25 at one end and a brake flange head 26 at the other end. This flange carries a brake band 27, one end of which is anchored to the floor 28 by means of suitable anchor bolts 29, and the other end of which is attached to a wrist or short crank 30 having a brake lever 31 for applying the brake.

By having a drum of relatively large diameter and employing gears for driving the drum-shaft from the shaft 5, I am enabled to develop a peripheral speed on the drum which is substantially the same as that customarily used in present practice. I provide for driving the drum at two speeds from the line-shaft 5. For this purpose I provide a first-speed pinion 32, which is rigid on the line-shaft and which meshes with a large gear wheel 33 which is loose on the drum-shaft; I also provide a second-speed pinion 34, which is of larger diameter than the pinion 32 and which meshes with a gear wheel 35 loose on the drum shaft, and this gear wheel is of somewhat smaller diameter than the gear wheel 33.

I provide a first-speed clutch 36, which includes a sliding clutch collar 37 splined on the drum-shaft and controlled at will by a clutch lever 38 operated by a foot lever 39 rigidly attached to a rock-shaft 40, which also is rigidly secured to the clutch lever 38. The clutch lever 38 has a short arm 41 which extends down below the floor of the derrick and carries a spring 42 which normally holds the clutch open. The gear wheel 35 may be also disconnected or connected to the drum-shaft at will, that is to say, it has its own clutch 43, including a sliding clutch collar 44 which is splined on the drum-shaft and controlled by a clutch lever 45 fulcrumed on a bracket 46 and having an arm 47 which extends down through the floor, and this arm is connected by a link 48 with a bell-crank lever 49, which is mounted to rock loosely on the shaft 40; and this bell-crank lever includes a foot lever or treadle 50 which lies parallel with the foot lever 39. This clutch 43 is normally held open by a spring 51 attached to the lower arm of bell-crank lever 49.

The counter-shaft 6 is provided with a rigid cat-head 52, and a similar cat-head 53 is provided on the other end of the line-shaft 5.

The clutch 43 is a square-jaw clutch, but the clutch 36 has inclined jaws, so that if the clutch 43 is closed after the clutch 36 has been closed, the clutch 36 will automatically open.

I provide two bearings 54 and 55 for the line-shaft 5, disposed respectively on the posts 2 and 3. I prefer to locate the slower speed drive connection, that is to say, the pinion 32 and gear wheel 33, at the end of the line-shaft 5, so that these gear wheels are located near the bearing. This is advantageous for the reason that the forces being transmitted on this low-speed drive are greater than those being transmitted through the higher-speed driving connection 34, 35, and it is desirable to locate the point of application of these larger forces as near as possible to the bearing. It should be understood that these forces imparted through these driving connections are relatively large by reason of the relatively large diameter of the cable drum, which of course increases the leverage of the cable in pulling on the drum. In order to prevent any possibility of these large thrust forces exerted between the teeth of the pinions and gears from forcing the bearings away from each other, I construct the bearings 23 and 54 on a common bracket 56, which is bolted to the post 2; I also construct the bearings 24 and 55 on a common bracket 57 similar to the bracket 56 and bolted to the post 3.

The counter-shaft is mounted at its outer end in a suitable bearing 58 mounted on the post 4.

In operating this drawworks, the rotary table may be driven without driving any of the mechanism associated with the drum 21, by holding the clutch 12 closed and the clutch 10 open. By closing the main clutch 10, the line-shaft 5 may be driven, and by closing either one of the clutches 36 or 43, the drum 21 may be driven at the speed desired.

When it is desired to let the cable run down into the well by gravity under the action of the load on the cable, both the clutches 36 and 43 are left open and the drum 21 will then turn freely without rotating any gears whatever, as the gears 33 and 35 will be held against rotation by their pinions on the stationary line-shaft 5. This is advantageous because these drums are rotated at an exceedingly high speed under these circumstances, and it is therefore desirable to prevent transmission of the rotation of the drum to the line-shaft.

It is understood that the embodiment of the invention described herein is only one of the many embodiments this invention may take, and I do not wish to be limited in the practice of the invention, nor in the claims, to the particular embodiment set forth.

What I claim is:—

1. In a rotary drawworks, the combination of a frame, a drum-shaft and drum supported on the frame, a line-shaft supported on the frame, pinions on the line-shaft, gears loose on the drum-shaft meshing with said pinions for driving the drum-shaft from the line-shaft, a counter-shaft supported on the frame parallel with the line-shaft, a sprocket wheel on the countershaft, for driving the same from an engine, a driven gear wheel on the line-shaft, a driving gear-wheel on the counter-shaft meshing therewith to drive the line-shaft from the counter-shaft, a sprocket wheel loose on the counter-shaft for driving a rotary table from the counter-shaft, a clutch for connecting and disconnecting the drive from the counter-shaft to the line-shaft, enabling the drum to be at rest when the rotary table is being driven, and a clutch for connecting and disconnecting the sprocket wheel from the counter-shaft, enabling the line-shaft to be at rest while the rotary table is being driven.

2. In a rotary drawworks, the combination of a frame, a drum shaft rotatably mounted on the frame, a cable drum of relatively large diameter rigidly secured to the drum-shaft, a first-speed gear wheel loose on the drum-shaft, a clutch and a clutch lever for connecting the same at will to the drum-shaft, a second-speed gear wheel loose on the drum-shaft, a second-speed clutch with its controlling lever for connecting the second-speed gear wheel at will to the drum-shaft, a line-shaft supported on the frame, pinions carried thereby meshing respectively with the said gear wheels, a driven gear carried by the line-shaft, a counter-shaft supported on the frame below the level of the line-shaft, a driving gear loose on the counter-shaft meshing with the driven gear, a main clutch on the counter-shaft for connecting the driving gear to the counter-shaft at will, and operating when open to permit the line-shaft to be at rest when the counter-shaft is rotating, means for driving the counter-shaft, a sprocket wheel loose on the counter-shaft for driving a rotary table, and a clutch on the counter-shaft for connecting the sprocket wheel to the counter-shaft.

3. In a rotary drawworks, the combination of a frame, a drum-shaft rotatably mounted on the frame, a cable drum of relatively large diameter rigidly secured to the drum-shaft, a first-speed gear wheel loose on the drum-shaft, a clutch and a clutch lever for connecting the same at will to the drum-shaft, a second-speed gear wheel loose on the drum-shaft, a second-speed clutch with its controlling lever for connecting the second-speed gear wheel at will to the drum-shaft, a line-shaft supported on the frame, pinions carried thereby meshing respectively with the said gear wheels, a driven gear carried by the line-shaft, a countershaft supported on the frame (below the level of the line-shaft), a driving gear loose on the counter-shaft meshing with the driven gear, a main clutch on the counter-shaft for connecting the driving gear to the counter-shaft at will, and operating when open to permit the line-shaft to be at rest when the counter-shaft is rotating to drive the rotary table, means for driving the counter-shaft, a sprocket wheel loose on the counter-shaft for driving a rotary table, a clutch on the counter-shaft for connecting the sprocket wheel to the counter-shaft, and clutch levers for independently controlling the main clutch and the last named clutch, and mounted so that both levers move in the same direction to close the clutches.

4. In a rotary drawworks, the combination of a frame, a drum-shaft and drum supported on the frame, a line shaft supported on the frame, pinions on the line-shaft, gears loose on the drum-shaft meshing with said pinions, for driving the drum-shaft from the line shaft, a counter-shaft supported on the frame parallel with the line-shaft, a driven gear wheel on the line-shaft, a driving gear wheel on the counter-shaft meshing therewith to drive the line-shaft from the counter-shaft, means on the counter-shaft for driving the same from a source of power, a sprocket wheel loose on the counter-shaft and located toward one end of the drawworks for driving a rotary table from the counter-shaft, a clutch for connecting and disconnecting the drive from the counter-shaft to the line-shaft, and a clutch for connecting and disconnecting the sprocket wheel from the counter-shaft, enabling the line-shaft to be at rest while the rotary table is being driven.

5. In a rotary drawworks the combination of a supporting structure adapted to be rigidly secured on a derrick floor, the supporting structure including a pair of posts, a drum shaft carrying a spooling drum rotatably supported by said posts, a line shaft supported by said supporting structure above and parallel to said drum shaft, drum shaft drive means mounted on the line shaft whereby said line shaft may drive said drum shaft, a counter shaft rotatably mounted on said supporting means below the line shaft and parallel with the line shaft, means for driving the counter shaft, the counter shaft extending laterally beyond said posts of the supporting structure, a rotary drive sprocket mounted on the counter shaft beyond said posts in such a position that the sprocket chain on said rotary drive sprocket may extend to the rotary machine at one side of the post of said supporting structure, and means mounted on the counter shaft whereby said counter shaft may drive said line shaft.

6. In a rotary drawworks the combination of a supporting structure adapted to be rigidly secured on a derrick floor, the supporting structure including a pair of posts, a drum shaft carrying a spooling drum rotatably supported by said posts, a line shaft supported by said supporting structure above and parallel to said drum shaft, drum shaft drive means mounted on the line shaft whereby said line shaft may drive said drum shaft, a counter shaft rotatably mounted on said supporting means below the line shaft and parallel with the line shaft, means for driving the counter shaft, the counter shaft extending laterally beyond said posts of the supporting structure, a rotary drive sprocket mounted on the counter shaft beyond said posts in such a position that the sprocket chain on said rotary drive sprocket may extend to the rotary machine at one side of the post of said supporting structure, means mounted on the counter shaft whereby said counter shaft may drive said line shaft, clutching means for connecting said drive sprocket to said line shaft, and additional clutching means between said drum and line shaft.

7. In a rotary drawworks the combination of a supporting structure adapted to be rigidly secured on a derrick floor, the supporting structure including a pair of posts, a drum shaft carrying a spooling drum rotatably supported by said posts, a line shaft supported by said supporting structure above and parallel to said drum shaft, plural drive means connecting said line shaft to said drum shaft whereby said drum shaft may be driven at a plurality of different speeds by said line shaft, a counter shaft rotatably mounted on said supporting means below the line shaft and parallel with the line shaft, means for driving the counter shaft, the counter shaft extending laterally beyond said posts of the supporting structure, a rotary drive sprocket mounted on the counter shaft beyond said posts in such a position that the sprocket chain on said rotary drive sprocket may extend to the rotary machine at one side of the post of said supporting structure, and means mounted on the counter shaft whereby said counter shaft may drive said line shaft.

Signed at Torrance, Calif., this 3rd day of March, 1924.

JOHN A. YOUNG.